United States Patent [19]
Arakawa

[11] Patent Number: 5,457,622
[45] Date of Patent: Oct. 10, 1995

[54] AC-DC CONVERTER

[75] Inventor: Koji Arakawa, Kawagoe, Japan

[73] Assignee: Toko, Inc., Tokyo, Japan

[21] Appl. No.: 128,581

[22] Filed: Sep. 28, 1993

[30] Foreign Application Priority Data

Oct. 2, 1992 [JP] Japan ................... 4-289312

[51] Int. Cl.⁶ ................................. H02M 3/18
[52] U.S. Cl. ................... 363/59; 323/222; 363/49
[58] Field of Search ................... 363/49, 59, 60, 363/89, 95, 97, 131, 18–21; 323/222, 901, 224

[56] References Cited

U.S. PATENT DOCUMENTS

| | | | |
|---|---|---|---|
| 4,866,590 | 9/1989 | Odaka et al. | 363/49 |
| 5,359,274 | 10/1994 | Bandel | 323/222 X |
| 5,371,667 | 12/1994 | Nakao et al. | 363/89 X |
| 5,373,195 | 12/1994 | De Doncker et al. | 323/222 X |

FOREIGN PATENT DOCUMENTS 3-32356  2/1991  Japan.

Primary Examiner—A. D. Pellinen
Assistant Examiner—Y. Jessica Han
Attorney, Agent, or Firm—Frishauf, Holtz, Goodman, Langer & Chick

[57] ABSTRACT

A power-factor improved AC-DC converter has a rectifier circuit, a booster converter circuit and a DC-DC converter circuit. A winding on a converter transformer of the DC-DC converter circuit supplies power to both a DC-DC converter control circuit and a booster converter control circuit. In starting up the AC-DC converter, the DC-DC converter circuit is started first, followed by start of operation of the booster converter circuit. With this arrangement, power-factor improved AC-DC converter can be realized with minimum increase in the size and production cost, and the start-up characteristic is improved to avoid failure of start up of the AC-DC converter.

5 Claims, 3 Drawing Sheets 5,457,622

1

AC-DC CONVERTER

BACKGROUND OF THE INVENTION

1. Field of the Invention

The present invention relates to an AC-DC converter which is improved to ensure safe start up and to increase the power factor, while avoiding increase in the number of parts or component of the circuit.

2. Description of the Related Art

Rectifier/smoothing circuit of capacitor-input type has been used as means for rectifying A.C. input of AC-DC converter circuit of various types of electronic apparatuses, by virtue of its simple construction. In recent years, however, a problem has been reported in which higher harmonics are undesirably generated in commercial power line by electronic apparatuses having rectifying/smoothing circuits of capacitor-input type, resulting in erroneous operation of other electronic apparatuses connected to the same power line.

This has given a rise to the demand for power-factor improved AC-DC converter in which generation of higher harmonics is suppressed. To cope with this demand, AC-DC converters have been proposed which employs various measures for improving power factor.

FIG. 3 shows the circuit of a known AC-DC converter of improved power factor type. This AC-DC converter has the following circuit construction. A rectifier circuit 8 is connected to a commercial power line through input terminals 11A, 11B. The output of the rectifier circuit 8 is connected to the input terminal of a booster converter circuit 9 the output of which is connected to the input of a DC-DC converter circuit 10. The output of the DC-DC converter 10 is connected to an external load through output terminals 12A, 12B.

The above-mentioned booster converter circuit 9 is of the type known as "active filter".

More specifically, the rectifier circuit 8 has a rectifier 1 having A.C. input terminals connected to the above-mentioned input terminals 11A, 11B. The positive rectified output terminal of the rectifier 1 is connected to the primary winding L1 of the transformer 5 of the booster converter circuit 9 through a rush current prevention resistor R1, while the negative rectified output terminal of the same is connected to the low-potential line which is formed by the booster converter circuit 9, DC-DC converter circuit 10, and output terminal 12B.

The booster converter circuit 9 has the following circuit construction.

One end of the primary winding L1 of the transformer 5 is connected to the rush current prevention resistor R1 of the rectifier circuit 8, while the other end of the primary winding L1 is connected to the anode of a diode D1. The primary winding L1 functions also as a choke coil during operation of the booster converter circuit 9.

The cathode of the diode D1; serving as the output end of he booster converter Circuit 9, is connected to the DC-DC converter circuit 10.

An output capacitor C1 is connected between the cathode of the diode D1 and the low-potential line. A switching transistor Q1 has a principal current path which is connected between the anode of the diode D1 and the low-potential line.

A booster converter control circuit 2 has a control output

2 terminal which is connected to the gate of the transistor Q1, while a voltage detecting terminal of the same is connected to the positive terminal of the output capacitor C1. The booster converter control circuit 2 also has a grounding terminal which is connected to the low-potential line.

The secondary winding L2 of the transformer 5 has one end connected to the low-potential line, while the other end is connected to the power input terminal of the booster converter control circuit 2 via the diode D2. The forward direction of the diode D2 is determined such that current is allowed to flow from the secondary winding L2 to the booster converter control circuit 2.

A series connection composed of a resistor R2 and a diode D3 is connected between the terminal of the primary winding L1 of the transformer 5 connected to the rectifier circuit 8 and the power input terminal of the booster converter control circuit 2. The forward direction of the diode D3 is so determined that the current flows from the resistor R2 to the booster converter control circuit 2.

The series connection of the resistor R2 and the diode D3, connected to the power input terminal of the booster converter control circuit 2, serves as a power supply circuit when the booster converter control circuit 2 is started. The series connection formed by the secondary winding L2 and the diode D2 serves as a power supply circuit which continues the supply of the power to the booster converter control circuit 2 after the start up of the same, Thereby keeping the booster converter control circuit 2 operative.

The secondary winding L2 of the transformer 5, the resister R2 and the diodes D2, D3 in cooperation form a booster converter driving power supply 6A for driving the booster converter.

The DC-DC converter circuit 10 has the following circuit construction. The DC-DC converter circuit 10 has a converter transformer 4 having a primary winding N1, a secondary winding N2 and a ternary winding N3. One end of the primary winding N1 is connected to the output terminal of the booster converter circuit 9, while the other end of the primary winding N1 is connected to the low-potential line through a principal current path of the switching transistor Q2.

A rectifying/smoothing circuit composed of a rectifier diode D6, a fly-wheel diode D7, a choke coil L3 and a smoothing capacitor C2 is connected to the secondary winding N2 of the converter transformer 4. Both ends of the smoothing capacitor C2 are connected to the output terminals 12A and 12B.

The DC-DC converter control circuit 3 has a control output terminal. which is connected to the gate of the switching transistor Q2, while the voltage detecting terminal of the same is connected to the positive terminal of the smoothing capacitor C2. The grounding terminal is connected to the low-potential line.

The ternary winding N3 of the converter transformer 4 is connected at its one end to the low-potential line, while the other end of the same is connected to the power supply input terminal of the DC-DC converter control circuit 3 through a diode D5. The diode D5 has such a forward direction that electrical current flows from the ternary winding N3 to the DC-DC converter control circuit 3. A series connection including a resistor R3 and a diode D4 is connected between the terminal of the primary winding N1 of the converter transformer 4 connected to the booster converter circuit 9 and the power input terminal of the DC-DC converter control circuit 3. The diode D4 has such a forward direction that the current flows from the resistor R3 to the DC-DC converter control circuit 3.

The series connection of the resistor R3 and the diode D4, connected to the power input terminal of the DC-DC converter control circuit 3, forms a power supply circuit which supplies power to the DC-DC converter control circuit 3 when the latter is started, while the series connection composed of the ternary winding N3 and the diode D5 functions as a power supply circuit which supplies power to the DC-DC converter control circuit 3 to keep it operative after the start.

The ternary winding N3 of the converter transformer 9, resistor R3, and the diodes D4, D5 in cooperation form a DC-DC converter driving power supply circuit 7 for driving the DC-DC converter.

A brief description will now be given of the operation under normal condition of the AC-DC converter shown in FIG. 3. The AC input from the commercial power line is rectified by the rectifier circuit 8 the output of which is supplied to the booster converter circuit 9. The booster converter circuit 9 then generates, as a result of functioning of the primary winding L1 of the transformer 5 and the switching transistor Q1, a voltage greater than the rectified output voltage of the rectifier circuit 8. This voltage is applied across the output capacitor C1 to charge it. The DC-DC converter circuit 10 receives energy from the output capacitor C1 and converts it into a D.C. stabilized output which is then outputted through output terminals 12A, 12B.

The known AC-DC converter, through the operation described above, provides a stable output and, in addition, does not produce higher harmonics in the commercial power line, thanks to the high power factor of the circuit.

The reason why the circuit construction shown in FIG. 3 improves the power factor is not described because such reason is well known to those skilled in the art in regard to improvement in power factor of booster converter circuits which are generally referred to as, for example, "active filter".

The following problem is encountered when the AC-DC converter circuit is started. Firstly, in general, the rectifier circuit 8, booster converter circuit 9 and the DC-DC converter circuit 10 are started in the mentioned order in accordance with the direction of flow of the electric energy. Namely, the rectifier circuit 8 is started first, followed by the operation of the booster converter circuit 9. In order that the booster converter circuit 9 can start by itself from the beginning, it is necessary to employ a booster converter driving power supply circuit 6A which has a function to start the booster converter control circuit 2.

The second problem is as follows. The output capacitor C1 is charged after the operation of the booster converter circuit 9. It is necessary that the starting of the DC-DC converter circuit 10 is conducted after the voltage across the output capacitor C1 has been raised to exceed a predetermined voltage level. It is therefore necessary that the DC-DC converter driving power supply 7 for driving the DC-DC converter control circuit 3 or, alternatively, the DC-DC converter control circuit 3 itself, is provided with such a function that allows the DC-DC converter circuit 10 to start only after the voltage charged in the output capacitor C1 has sufficiently exceeded the minimum operation input voltage of the DC-DC converter circuit.

The following problem is caused when such a function is lacked. Assume here that the DC-DC converter circuit 10 has started when the voltage charged in the output capacitor C1 is substantially equal to the minimum operation input voltage of the DC-DC converter circuit 10. In such a case, the rise of the voltage charged in the output capacitor C1 stagnates due to balance between the impedance of the booster converter circuit 9 and the energy supplied to the DC-DC converter circuit 10, with the result that the output of the DC-DC converter circuit 10, which has to be stabilized, cannot be stabilized satisfactorily.

Due to the two major problems described above, the AC-DC converter of the type incorporating the power-factor improved circuit including the booster converter circuit essentially has a more complicated construction than ordinary AC-DC converter which employs a capacitor-input type rectifying/smoothing circuit, with the result that the dimensions and the cost are increased in the AC-DC converter of the type mentioned above.

In particular, the second problem impairs the reliability of operation of the AC-DC converter at the time of stare up of the converter.

SUMMARY OF THE INVENTION

In view of the problems of the known art described above, it is an object of the present invention to provide a reliable power-factor improved AC-DC converter which can start without fail, while suppressing complication of circuit arrangement so as to minimize increase in the dimensions and cost of the AC-DC converter.

To this end, according to the present invention, there is provided a power-factor improved AC-DC converter, comprising: a rectifier circuit for rectifying A.C. input from a commercial power line; a booster converter circuit which produces a D.C. output voltage higher than the output voltage of the rectifier circuit; and a DC-DC converter circuit which, upon receipt of the D.C. output energy from an output capacitor of the booster converter circuit as the input, produces D.C. stabilized output and delivers it to an external load; wherein power for driving a control circuit of the booster converter circuit is derived from a winding on a converter transformer of a DC-DC converter circuit, and wherein the operation of the booster converter circuit is commenced after the start of operation of the DC-DC converter circuit.

DESCRIPTION OF THE PREFERRED EMBODIMENTS

Figure 1:
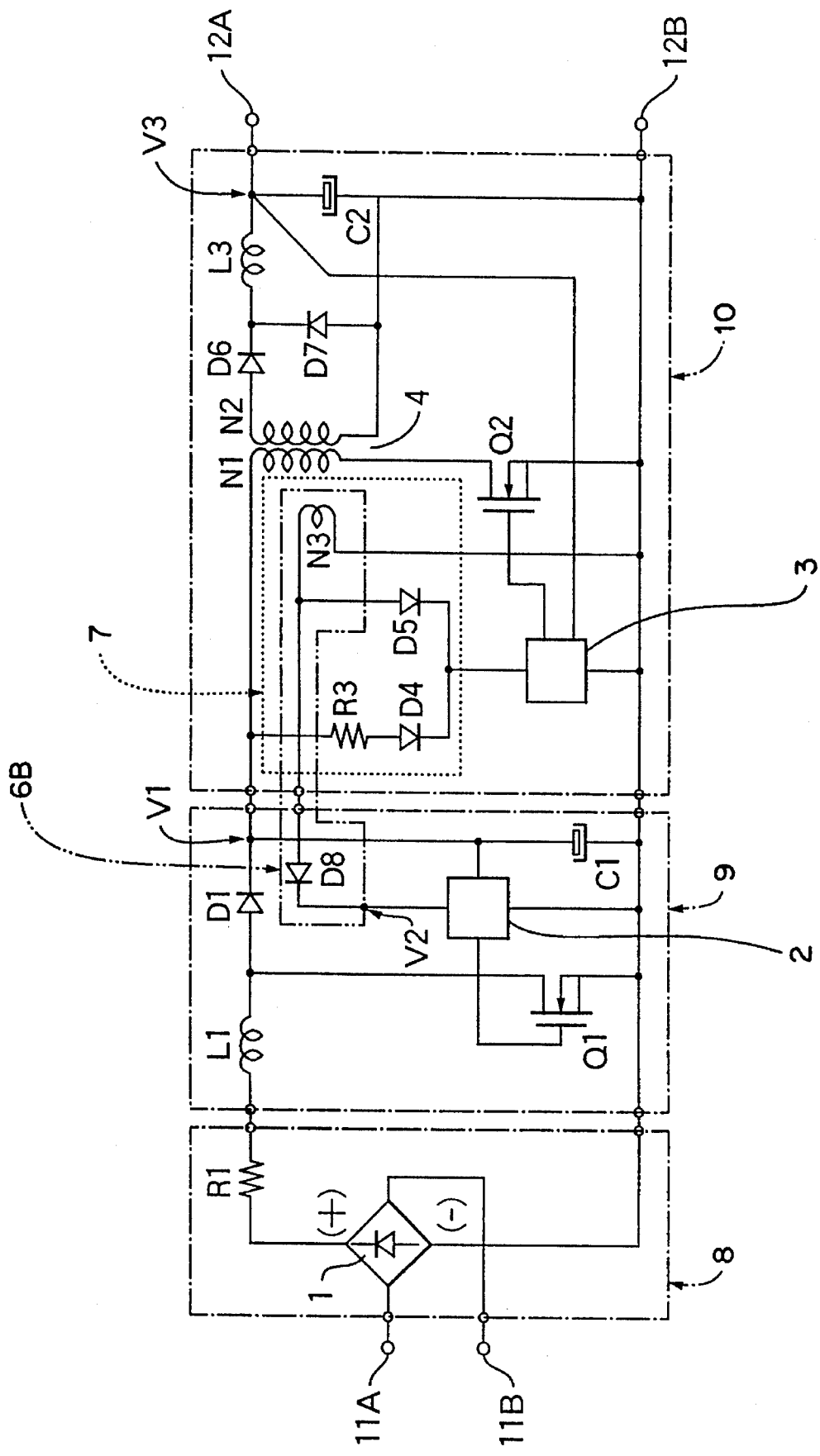
FIG. 1 is a circuit diagram showing the construction of an embodiment of the AC-DC converter in accordance with the present invention.

FIG. 1 shows an embodiment of the AC-DC converter in accordance with the present invention. The AC-DC converter has a rectifier circuit 8 which is connected to a commercial power line through input terminals 11A, 11B. The output of the rectifier circuit 8 is connected to the input of a booster converter circuit 9. The output of the booster converter circuit 9 is connected to the input terminal of a DC-DC converter circuit 10. The output terminal of the DC-DC converter circuit 10 is connected to an external load through output terminals 12A, 12B. Other parts or components which are the same as those in the known converter shown in FIG. 3 are denoted by the same reference numerals as those appearing in FIG. 3.

Figure 3:
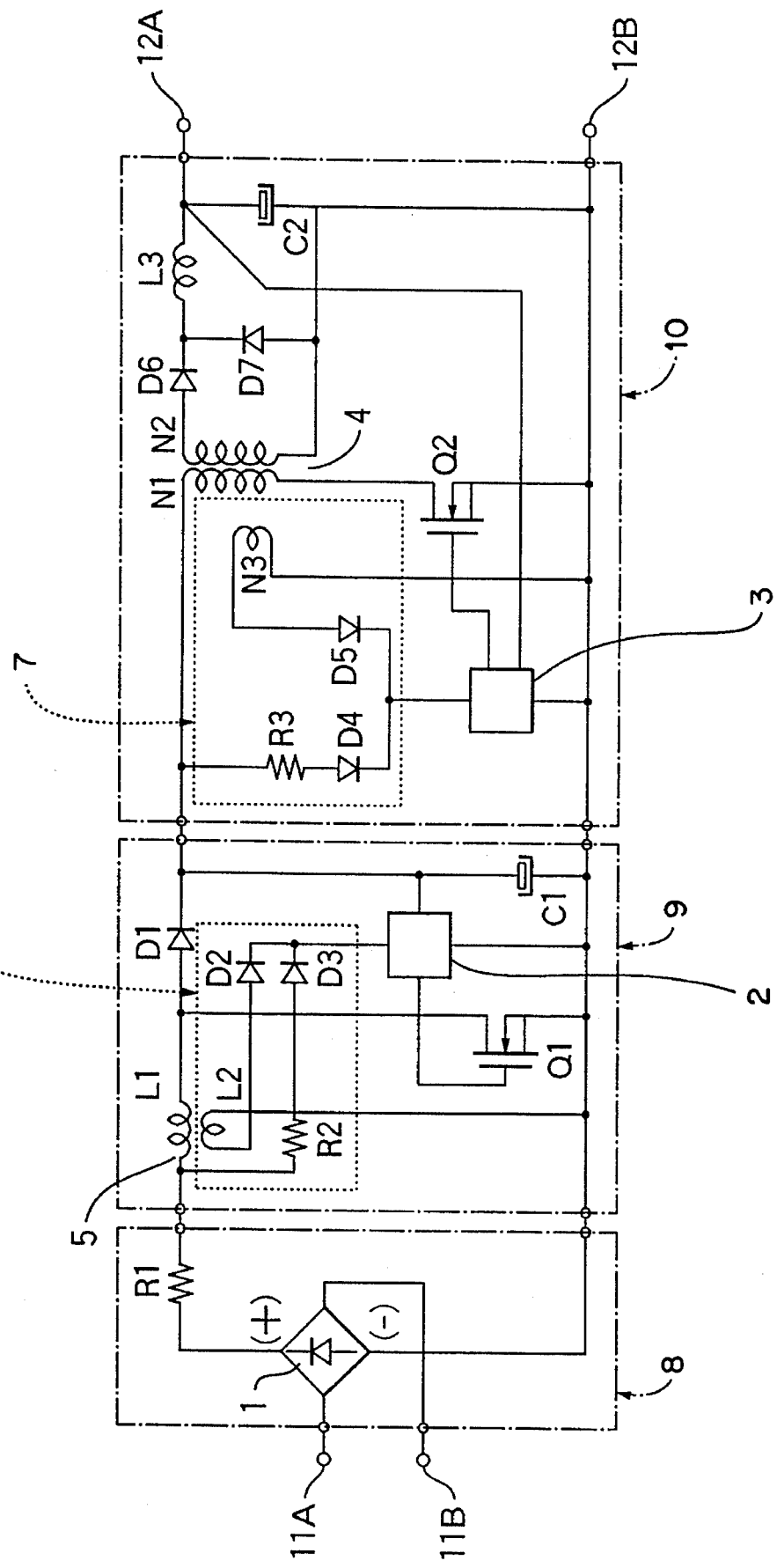
FIG. 3 is a circuit diagram of a known AC-DC converter circuit.

The rectifier circuit 8 has the same construction as that in the known AC-DC converter shown in FIG. 3. The construction of the booster converter circuit 9 shown in FIG. 1 is as follows.

One end of the choke coil L1 is connected to a rush-current prevention resistor R1 of the rectifier circuit B, while the other end is connected to the anode of a diode D1.

The cathode of the diode D1, serving as the output end of the booster converter circuit 9, is connected to the DC-DC converter circuit 10.

An output capacitor C1 is connected between the cathode of the diode D1 and the low-potential line. A switching transistor Q1 has a principal current path of electrical current connected between the anode of the diode D1 and the low-potential line.

A booster converter control circuit 2 has a control output terminal which is connected to the gate of the switching transistor Q1, while the voltage detecting terminal of the same is connected to the positive terminal of the output capacitor C1. The grounding terminal is connected to the low-potential line.

The booster converter control circuit 2 has a power input terminal which is connected, through a diode D8, to a terminal of the ternary winding N3 of a converter transformer 4 in the DC-DC converter circuit 10. The above-mentioned terminal of the ternary winding N3 is also connected to a diode D5. The diode D8 has such a forward direction as to permit electrical current to flow from the ternary winding N3 to the booster converter control circuit 2.

The diode D8, together with the ternary winding N3 to which it is connected in series, forms a booster converter driving power supply circuit 6B.

The DC-DC converter circuit 10 has a circuit construction which is the same as that of the DC-DC converter circuit 10 shown in FIG. 3, except for the construction of the DC-DC converter driving power supply circuit 7.

More specifically, in the embodiment shown in FIG. 1, the DC-DC converter driving power supply circuit 7 is composed of the ternary winding N3 of the converter transformer 4, resistor R3 and diodes D4 and D5.

One end of the ternary winding N3 is connected to the low-potential line, while the other end is connected to the power input terminal of the DC-DC converter control circuit 3 through the diode D5. The other end of the ternary winding N3 also is connected to the power input terminal of the booster converter control circuit 2 through the diode D8 of the booster converter 9. The diode D5 has such a forward direction as to permit electrical current to flow from the ternary winding N3 to the DC-DC converter Control circuit 3.

A series connection composed of a resistor R3 and a diode D4 is connected between the terminal of the primary winding N1 of the converter transformer 4 connected to the booster converter circuit 9 and the power input terminal of the DC-DC converter control circuit 3. The diode D4 has such a forward direction as to permit electrical current to flow from the resistor R3 to the DC-DC converter control circuit 3.

The series connection composed of the resistor R3 and the diode D4, connected to the power input terminal of the DC-DC converter circuit 3, functions as a power supply circuit which supplies electrical power to the DC-DC converter control circuit 3 when the latter is started. The series connection composed of the ternary winding N3 and the diode D5 functions as a power supply circuit which enables the DC-DC converter control circuit 3 to operate after the circuit 3 is started.

A comparison between the booster converter driving power supply circuit 6B shown in FIG. 1 with the booster converter driving power supply circuit 6A of FIG. 3 proves that the former does not necessitates any circuit for starting. In addition, in the embodiment shown in FIG. 1, the electrical power for driving the booster converter control circuit 2 is derived from the ternary winding N3 of the converter transformer 4. Consequently, the same winding is used commonly both for the boosting converter driving power supply circuit 6B and the DC-DC converter driving power supply circuit 7. Thus, the booster converter driving power supply circuit 6B used in the present invention can have a very simple construction.

Figure 2:
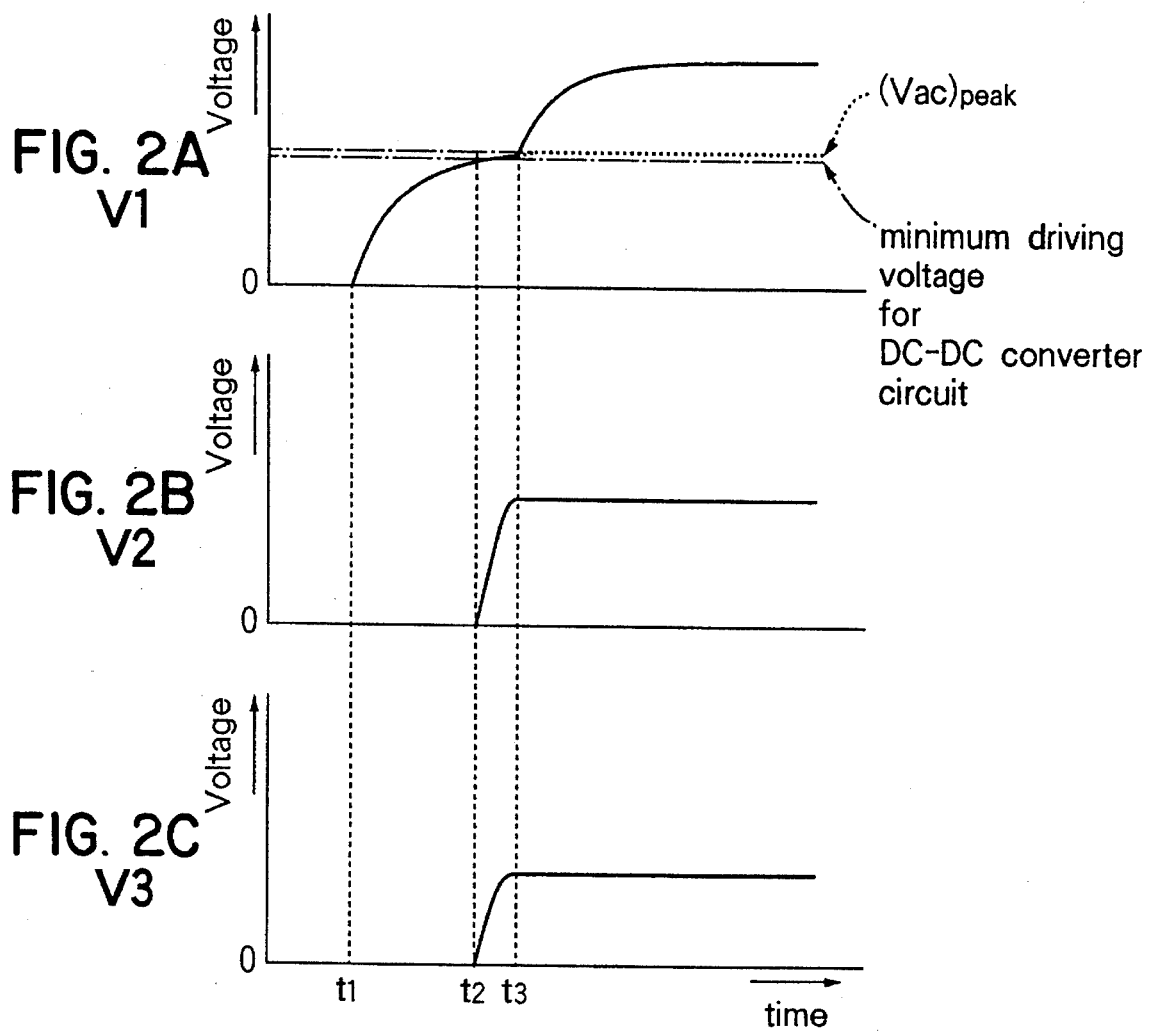
FIG. 2 is an illustration of changes in voltages available at various portions of the circuit shown in FIG. 1.

FIG. 2 is a chart showing waveforms of voltages available at various portions of the AC-DC converter of FIG. 1 when the AC-DC converter is started.

The voltage charged in the capacitor C1 is indicated by V1, while V2 indicates the input power supply voltage supplied to the booster converter control circuit 2. The output voltage of the AC-DC converter is represented by V3.

The operation of the circuit of FIG. 1 will now be described with specific reference to FIG. 2. An A.C. voltage is supplied from the commercial power supply line to the rectifier circuit 8 at a moment t1. The input A.C. voltage is rectified by the rectifier 1, so that electrical current flows from the rectifier 1 to the output capacitor C1, through the rush-current prevention resistor R1, choke coil L1 and the diode D1, thereby charging the output capacitor C1. Consequently, the voltage across the output capacitor C1 is raised towards the level of the peak voltage of the A.C. voltage supplied to the rectifier circuit 8.

From the view points of efficiency and other factors, the DC-DC converter circuit 10 is preferably designed such that the minimum operation input voltage which can stabilize the output be set as high as possible. The minimum operation input voltage is therefore set to a level which is between 0.9 to 1.0 times the peak value of the above-mentioned A.C. voltage. In such a case, the DC-DC converter circuit 10 starts to operate at a moment t2 at which the voltage V1 charged in the output capacitor C1 reaches the minimum operation input voltage, so as to produce a stabilized output V3.

When the DC-DC converter Circuit 10 has commenced the operation, electrical current flows through the primary winding N1 of the converter transformer 4, so that voltages are induced in the secondary and ternary windings N2 and N3. Consequently, the power supply voltage V2 starts to rise so that a voltage is applied to the booster converter control circuit 2.

The booster converter circuit 9 starts to operate at a moment t3 at which the power supply voltage V2 supplied to the booster converter control circuit 2 rises.

The voltage V1 charged in the output capacitor C1 connected to the output of the booster converter circuit 9 starts to rise as the booster converter circuit 9 starts to operate.

The voltage V1 across the output capacitor C1, after reaching the level V1 shown in FIG. 2 set by the booster converter control circuit 2, is held at a constant value. In this state, the AC-DC converter stably operates. The D.C. stabilized output produced by the DC-DC converter circuit 10 appearing between the output terminals 12A and 12B has already been stabilized since the moment t3.

According to the present invention, the AC-DC converter can be started up through a sequence of operations including rectification of A.C. voltage by the rectifier circuit 8, charging of the output capacitor C1 by the rectified output, starting of the DC-DC converter circuit 10 by the rise of the charged voltage across the output capacitor C1 and the starting of the booster converter 9 performed by the operation of the DC-DC converter circuit 10, without requiring specific separate power supply circuits for starting the booster converter circuit 9 and the DC-DC converter circuit 10.

In addition, it is possible to operate the AC-DC converter while avoiding such a state of operation that the output of the AC-DC converter cannot be fully stabilized after the start up.

The embodiment shown in FIG. 1 employs a converter transformer having three windings, the ternary one of which is commonly used for the booster converter driving power supply circuit 6B and the DC-DC converter driving power supply circuit 7. This, however, is only illustrative and the arrangement may be such that four or more windings are incorporated in the converter transformer so that separate windings are used for the booster converter driving power supply circuit 6B and the DC-DC converter driving power supply circuit 7, respectively.

As will be understood from the foregoing description, the present invention features that the electrical power for driving the booster converter circuit is derived from a winding of a converter transformer, and that the starting of the AC-DC converter is conducted by sequentially executing the steps of rectifying A.C. voltage by the rectifier circuit, charging the output capacitor with the rectified output, starting the DC-DC converter circuit by a rise of the voltage across the output capacitor and starting the booster converter circuit by the operation of the DC-DC converter circuit.

Consequently, the circuit construction is simplified so that increase in the number of parts or components can be suppressed in the production of a power-factor improved AC-DC Converter.

Furthermore, start up of the AC-DC converter can be conducted at a high degree of reliability, without paying any specific consideration to the time difference between the successive operations of the circuit components.

Thus, the present invention provides a highly reliable AC-DC converter while minimizing increase in the dimensions and cost of the AC-DC converter.

What is claimed is:

1. A power-factor improved AC-DC converter comprising:

a rectifier circuit for rectifying AC input from a commercial power line;

a booster converter circuit which produces a DC output voltage higher than the output voltage of said rectifier circuit; and a DC-DC converter circuit which, upon receipt of the DC output energy from an output capacitor of said booster converter circuit as the input, produces a DC stabilized output and delivers it to an external load;

wherein power for driving a control circuit of said booster converter circuit is derived from a winding on a converter transformer of said DC-DC converter circuit, and wherein the operation of said booster converter circuit is commenced after the start of operation of said DC-DC converter circuit.

2. An AC-DC converter according to claim 1, wherein, when said AC-DC converter is started, a control circuit of said DC-DC converter circuit is started at a moment at which the voltage across said output capacitor on the output end of said booster converter circuit, charged by the output voltage of said rectifier circuit, reaches a level which is 0.9 to 1.0 times as high as the peak value of the AC input voltage.

3. A power-factor improved AC-DC converter, comprising:

a rectifier circuit for rectifying AC input from a commercial power line;

a booster converter circuit which produces a DC output voltage higher than the output voltage of said rectifier circuit; and a DC-DC converter circuit which, upon receipt of the DC output energy from an output capacitor of said booster converter circuit as the input, produces a DC stabilized output and delivers it to an external load;

wherein the power for driving said control circuit of said booster converter circuit is derived from a winding which is wound in a converter transformer of said DC-DC converter circuit and which supplies driving electrical power to a control circuit of transformer circuit.

4. An AC-DC converter according to claim 3, wherein said booster converter circuit is arranged to start after stabilization of the DC output voltage raised by the operation of said DC-DC converter circuit.

5. A power-factor improved AC-DC converter, comprising:

a rectifier circuit for rectifying AC input from a commercial power line;

a booster converter circuit which produces a DC output voltage higher than the output voltage of said rectifier circuit; and a DC-DC converter circuit which, upon receipt of the DC output energy from an output capacitor of said booster converter circuit as the input, produces DC stabilized output and delivers it to an external load;

wherein said DC-DC converter circuit includes a converter transformer having at least one power supply winding in addition to primary and secondary windings, said power supply winding being connected to power input terminals of a control circuit of said booster converter circuit and a control circuit of said DC-DC converter circuit, through respective rectifying elements, said booster converter circuit having an output terminal connected to said power input terminal of said control circuit of said DC-DC converter circuit through a rectifying element and a resistor element, and wherein, when said AC-DC converter is started, said control circuit of said DC-DC converter circuit is started at a moment at which the voltage across said output capacitor on the output end of said booster converter circuit, charged by the output voltage of said rectifier circuit, reaches a level which is 0.9 to 1.0 times as high the peak value of the A.C. input voltage, and said booster converter circuit starts after stabilization of the DC output voltage raised by the operation of said DC-DC converter circuit.

* * * * *